(12) United States Patent  
Sawdon et al.

(10) Patent No.: US 6,488,273 B2
(45) Date of Patent: Dec. 3, 2002

(54) POWERED PIVOT UNIT

(75) Inventors: Edwin G. Sawdon, St. Clair, MI (US); Dean J. Kruger, Jeddo, MI (US); Andrew T. Sanders, Fort Gratiot, MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 09/839,566

(22) Filed: Apr. 20, 2001

(65) Prior Publication Data

US 2002/0153650 A1 Oct. 24, 2002

(51) Int. Cl.$^7$ .............................. B25B 1/00; B23G 3/00
(52) U.S. Cl. ........................................... 269/20; 269/32
(58) Field of Search ........................... 269/20, 32, 237, 269/238, 239, 24, 25, 27, 228, 93; 74/22 R, 63, 66, 96; 192/DIG. 1

(56) References Cited

U.S. PATENT DOCUMENTS

| | | | | |
|---|---|---|---|---|
| 2,553,973 A | * | 5/1951 | Keller et al. | |
| 3,171,332 A | * | 3/1965 | Randle | |
| 3,225,660 A | * | 12/1965 | Stange | |
| 3,554,096 A | * | 1/1971 | Southall | |
| 3,731,598 A | * | 5/1973 | Brignon et al. | |
| 3,783,746 A | * | 1/1974 | Jacobellis | |
| 3,839,945 A | * | 10/1974 | Jacobellis | |
| 4,009,644 A | * | 3/1977 | Higuchi et al. | |
| 4,759,186 A | * | 7/1988 | Sugden | |
| 4,784,047 A | * | 11/1988 | Stoll et al. | |
| 4,902,209 A | * | 2/1990 | Olson | 418/6 |
| 5,125,632 A | | 6/1992 | Blatt et al. | |
| 5,171,001 A | * | 12/1992 | Sawdon | 269/32 |
| 5,575,462 A | * | 11/1996 | Blatt | 269/32 |
| 5,622,096 A | | 4/1997 | Granberg | |
| 5,634,629 A | * | 6/1997 | Blatt | 269/32 |
| 5,799,932 A | * | 9/1998 | Blatt | 269/32 |
| 5,884,903 A | * | 3/1999 | Sawdon | 269/32 |
| 5,967,502 A | * | 10/1999 | Dykstra | 269/32 |
| 6,070,864 A | * | 6/2000 | Corey | 269/32 |
| 6,199,846 B1 | * | 3/2001 | Corey | 269/32 |

OTHER PUBLICATIONS

U.S. patent application Ser. No. 09/839,568, Sawdon, filed Apr. 20, 2001.*
Tünkers drawing dated Jan. 10, 1997.*
Norgren Advertisement, Power Pivot, date unknown.
De–Sta–Co Advertisement, Tooling & Production, Feb., 2001.
De–Sta–Co Advertisement, date unknown.
De–Sta–Co Pictures (2), date unknown.

* cited by examiner

Primary Examiner—Joseph J. Hail, III
Assistant Examiner—Daniel Shanley
(74) Attorney, Agent, or Firm—Harness, Dickey & Pierce, P.L.C.

(57) ABSTRACT

A apparatus includes an arm, a housing having a chamber, a vane rotatably movable within the chamber and an engaging member. The engaging member is slidingly coupled to the arm. The engaging member is selectively positionable in an engaged and a disengaged position with the vane such that the arm rotates in response to rotation of the vane when the engaging member is in the engaged position.

28 Claims, 9 Drawing Sheets

| BTM MODEL 1500 | | BTM MODEL 5000 | | BTM MODEL 10000 | |
|---|---|---|---|---|---|
| 300 | 5" | 1000 | 5" | 2000 | 5" |
| 150 | 10" | 500 | 10" | 1000 | 10" |
| 100 | 15" | 333 | 15" | 667 | 15" |
| 75 | 20" | 250 | 20" | 500 | 20" |
| 60 | 25" | 200 | 25" | 400 | 25" |
| 50 | 30" | 167 | 30" | 333 | 30" |
| 43 | 35" | 143 | 35" | 286 | 35" |
| 38 | 40" | 125 | 40" | 250 | 40" |
| 33 | 45" | 111 | 45" | 222 | 45" |
| 30 | 50" | 100 | 50" | 200 | 50" |
| Lifting Capacity (Lbs.) | From Pivot | Lifting Capacity (Lbs.) | From Pivot | Lifting Capacity (Lbs.) | From Pivot |

FIG. 11.

POWERED PIVOT UNIT

BACKGROUND AND SUMMARY OF THE INVENTION

The present invention relates generally to powered positioning devices and, more particularly, to a powered pivot unit for moving or positioning industrial tooling.

Pivot units are commonly used in industrial applications for positioning tooling or work pieces during forming and machining operations. The previously known devices include a pneumatically or hydraulically actuated linear piston cylinder which causes one or more arms to move through a desired range of rotational motion to position the tool or work piece. These devices are often large clamps equipped with a toggle mechanism to achieve the rotational motion of the tool mount. Unfortunately, the toggle mechanism exhibits a torque per rotation angle curve which is not linear. Because the tooling or components to be rotated may weight 100 pounds or more and are often mounted 48 inches from the pivot point, existing pivot units may be unable to lift the tool.

Many conventional pivot units use a linear fluid cylinder coupled to the linkage to provide the lifting force. The conventional pivot units have cylinders separately attached to a body. The stroke of the fluid cylinder is directly proportional to the amount of rotation available at the tool mounting end. In an attempt to conserve the amount of actuating fluid required, existing manufacturers provide families of power pivot units equipped with a variety of differently sized cylinders. Long cylinders are used if large rotation angles are desired. Large diameter cylinders are used to lift heavy loads. Therefore, an undesirably large number of assemblies must be maintained in inventory to provide manufacturing flexibility. The use of elongated fluid cylinders also creates a relatively large and unwieldly pivot unit assembly which requires extra space in the end use manufacturing plant. Also, service of the linkage or toggle mechanism requires that the tool holding portion be disassembled.

In accordance with the teachings of the present invention, a preferred embodiment of a powered pivot unit includes a rotary actuator which provides a generally constant torque output over the entire operating range of pivot angles. In another aspect of the present invention, the rotary actuator includes a rotary vane which is positioned on an opposite side of the pivot point relative to the rotating arm assembly. This effectively counter-balances the tooling to reduce the torque required to lift or position the tool. A further aspect of the present invention provides 105 degrees of available rotation from a single rotary actuator. Because the powered pivot unit of the present invention utilizes a rotary vane within an arcuate chamber, less pressurized fluid is required to obtain the full 105 degrees of rotation when compared to linear fluid cylinders.

Yet another aspect of the present invention includes integral stops, shocks and switch assemblies which are adjustable in generally 15 degree increments throughout the full 105 degree range of rotation. In still another aspect of the present invention, a lock is provided at each 15 degree position to maintain the position of the tool when service is required.

Yet another aspect of the present invention is directed to ease of serviceability. Specifically, the actuator assembly may be replaced as a cartridge without disturbing the tool-to-arm assembly interface nor the pivot unit-to-bench interface. Therefore, the time to service the powered pivot unit of the present invention is minimized.

Furthermore, another aspect of the present invention employs a rotary actuator coupled to the rotating arm assembly through a pair of hub assemblies having drive keys which are mounted on a pair of jack screws. To disengage the drive keys from the rotary actuator, the jack screws are simply rotated in place. Advantageously, the jack screws and drive keys do not become separated from the hub assembly during the disengagement process. This simplified service method assures that these components do not become lost or contaminated by the surrounding environment.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded perspective view of an actuator assembly of the powered pivot unit of the present invention;

DETAILED DESCRIPTION OF THE PREFERRED EMBODIMENT

Figure 1:
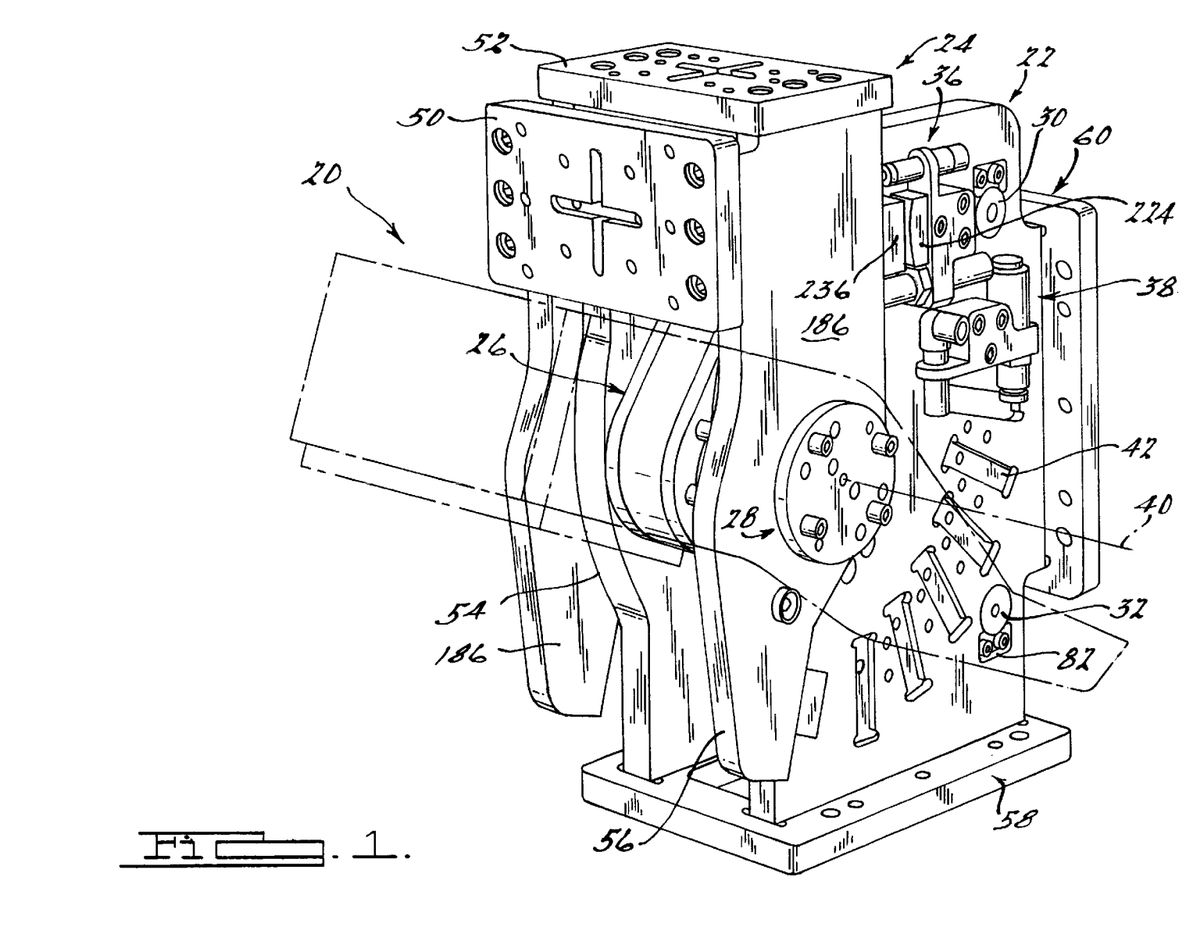
FIG. 1 is a perspective view of a powered pivot unit constructed in accordance with the teachings of the present invention.
Figure 2:
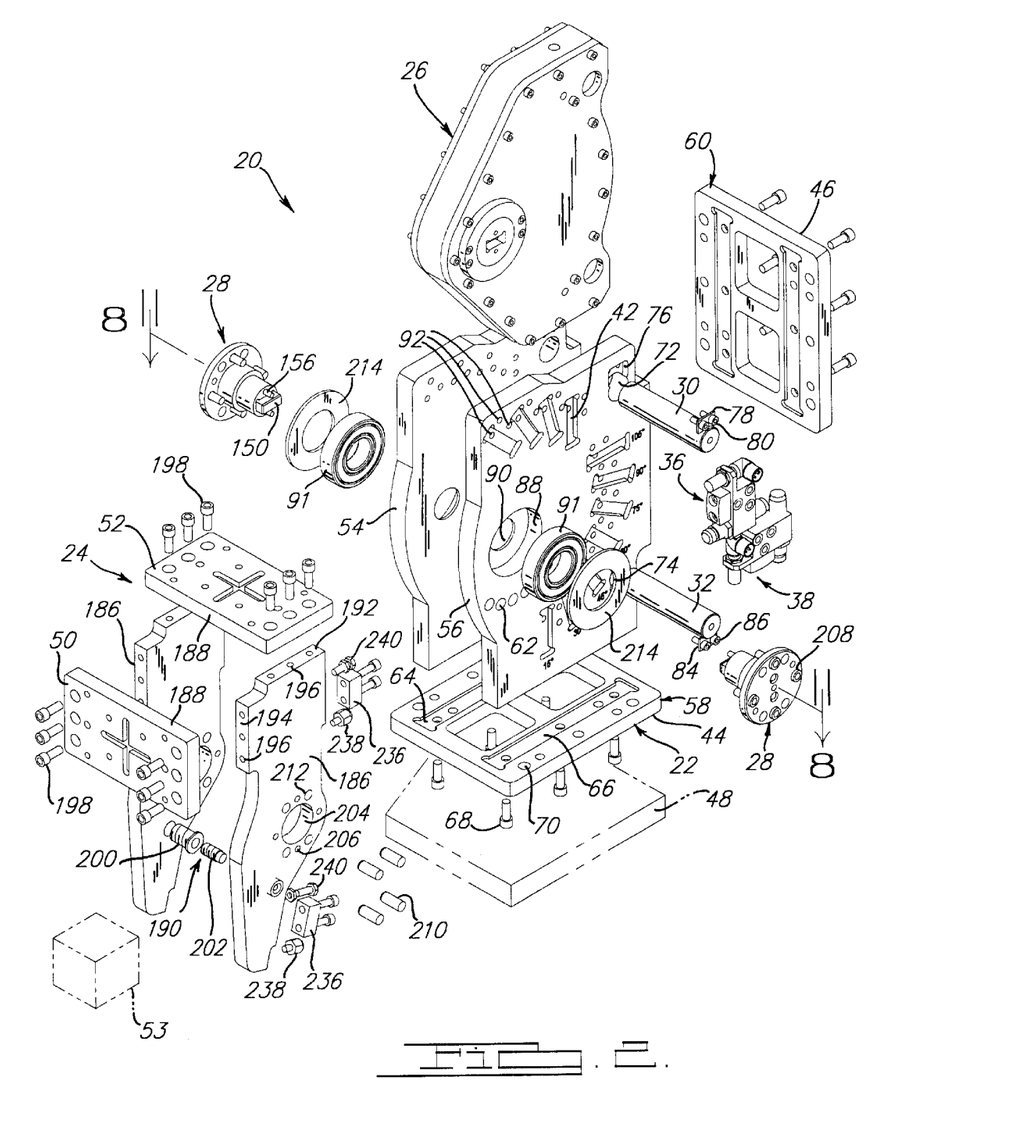
FIG. 2 is an exploded perspective view of the powered pivot unit of the present invention.

FIGS. 1 and 2 show the preferred embodiment of a powered pivot unit 20 constructed in accordance with the teachings of the present invention. Pivot unit 20 includes a frame assembly 22, an arm assembly or positioning bracket 24, an actuator assembly 26 and two hub assemblies 28. Actuator assembly 26 is rigidly coupled to frame assembly 22 via a first pin 30 and a second pin 32. Arm assembly 24 is drivingly interconnected to actuator assembly 26 via hub assemblies 28. In FIG. 1, arm assembly 24 is shown in a fully upright first position abutting a first shock assembly 36. Based on the position of a second shock assembly 38, arm assembly 24 may rotate about an axis 40 to a second position shown in phantom. The full stroke of actuator assembly 26 is substantially equivalent to 105 degrees of rotation. Frame assembly 22 includes a plurality of keyways 42 for receipt of the shock assemblies. In this manner, a range of arm rotation less than 105 degrees may be defined. Keyways 42 are positioned in 15 degree increments from each other.

An additional functional advantage of using powered pivot unit 20 includes versatile mounting. Specifically, frame assembly 22 includes a first mounting surface 44 and a second mounting surface 46 for coupling powered pivot unit 20 to a factory floor, a stantion, a workbench or the like. An exemplary bench 48 is shown as a suitable mounting structure in FIG. 2. In similar fashion, arm assembly 24 includes a first tool mounting surface 50 and a second tool mounting surface 52 for mounting an exemplary tool 53. First tool mounting surface is positioned substantially orthogonally to second tool mounting surface 52 to provide increased utility of powered pivot unit 20.

Frame assembly 22 functions to provide a robust support for actuator assembly 26 and arm assembly 24. Frame assembly 22 includes a first frame plate 54, a second frame plate 56, a first mounting plate 58 and a second mounting plate 60. First mounting plate 58 is substantially identical to second mounting plate 60. Accordingly, only first mounting plate 58 will be described in greater detail. First mounting plate 58 includes a first recess 64 and a second recess 66 for capturing a portion of first frame plate 54 and second frame plate 56 respectively. A plurality of fasteners 68 secure the frame plates to first mounting plate 58 in a predetermined, offset, and substantially parallel relationship. First mounting plate 58 also includes a plurality of apertures 70 for receipt of fasteners (not shown) for coupling first mounting plate 58 to bench 48. Second mounting plate 60 also interconnects first frame plate 54 and second frame plate 56. Second mounting plate 60 is preferably orthogonally positioned relative to first mounting plate 58 to provide a user a choice between first mounting surface 44 or second mounting surface 46.

Because second frame plate 56 is substantially similar to first frame plate 54, only second frame plate 56 will be described in detail. Second frame plate 56 includes a first pin aperture 72 and a second pin aperture 74 extending therethrough for receipt of first and second pins 30 and 32, respectively. First pin aperture 72 includes a detent 76 for receipt of a keeper 78 coupled to one end of first pin 30. A pair of fasteners 80 couple keeper 78 and first pin 30 to second mounting plate 60. A detent 82 is positioned adjacent second pin aperture to function in the same manner as detent 76. A keeper 84 is coupled to one end of second pin 32 and positioned within detent 82. Fasteners 86 couple keeper 84 and second pin 32 to second frame plate 56.

Second frame plate 56 also includes a generally cylindrical counter-bore 88 communicating with a co-axial through bore 90 of a smaller diameter. Counter bore 88 receives and aligns a deep groove ball bearing assembly 91. A set of three threaded apertures 92 is positioned about each keyway 42 to facilitate mounting of first shock assembly 36 and second shock assembly 38 to second frame plate 56. First shock assembly 36 may be positioned in any one of four keyways 42 positioned near the top of second frame plate 56. Second shock assembly 38 may be positioned in one of seven lower keyways 42 for limiting the rotation of arm assembly 24. The mounting plates and frame plates are preferably constructed from 6061-T651 Aluminum.

Figure 4:
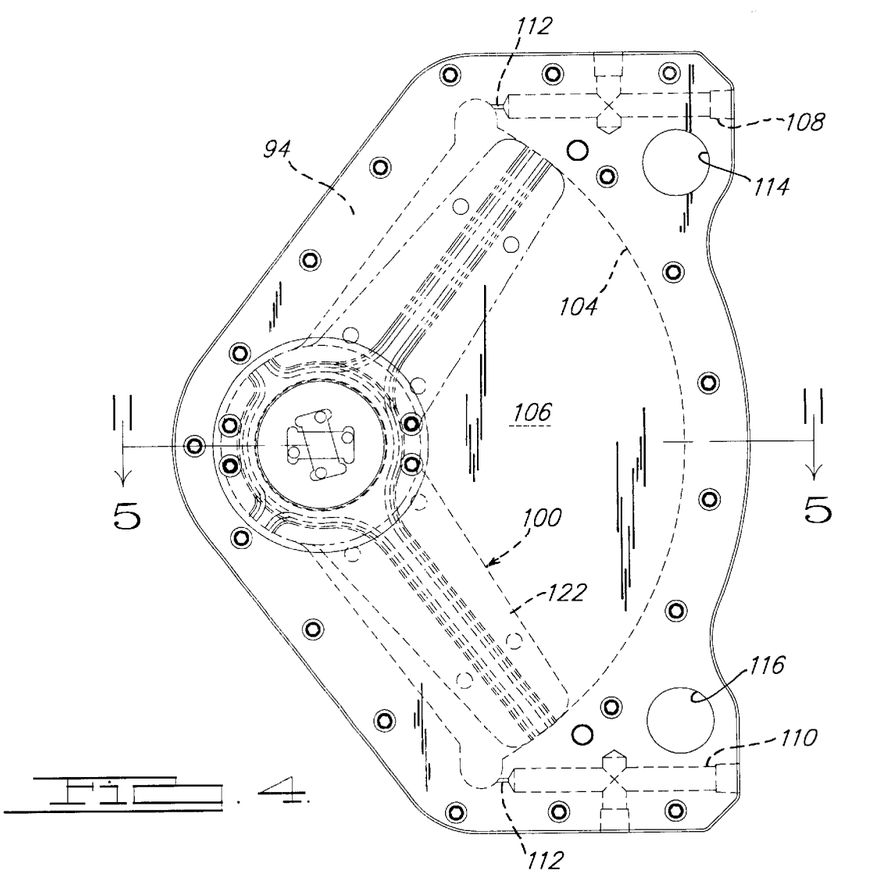
FIG. 4 is a cross-sectional side view of the actuator assembly constructed in accordance with the teachings of the present invention.
Figure 5:
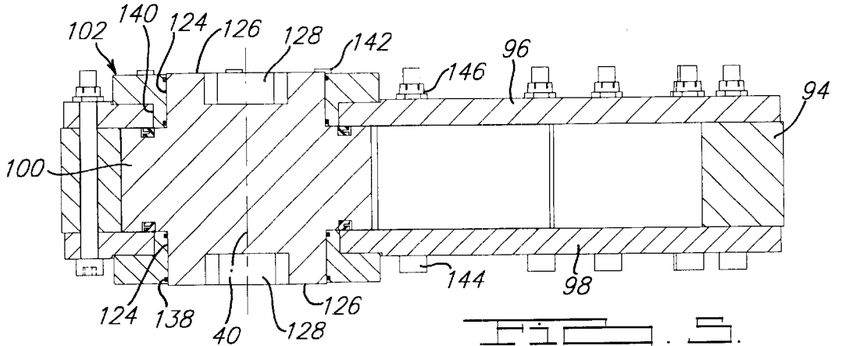
FIG. 5 is a cross-sectional view, taken along line 5—5 shown in FIG. 4, of the actuator assembly of the present invention.

With reference to FIGS. 3–5, actuator assembly 26 includes a body 94, a first cover plate 96, a second cover plate 98, a vane 100 and a pair of rotary bearings 102. Body 94 is a generally plate-like structure having an arcuately-shaped bore 104 extending therethrough. A chamber 106 is formed once first cover plate 96 and second cover plate 98 are coupled to body 94 thereby enclosing bore 104. Body 94 includes an inlet port 108 and an outlet port 110 communicating with chamber 106. Inlet port 108 and outlet port 110 each include an orifice 112 consisting of a relatively small diameter passageway adjacent chamber 106. Orifice 112 serves to reduce the volume flow rate of pressurized fluid entering the chamber and minimize possibly high internal impact loads.

Body 94, first cover plate 96 and second cover plate 98 each include a first pin aperture 114 and a second pin aperture 116. At assembly, actuator assembly 26 is displaced between first frame plate 54 and second frame plate 56. First pin 30 is inserted through apertures 72 and first pin aperture 114 to couple actuator assembly 26 to frame assembly 22. Similarly, second pin 32 is inserted through second pin apertures 74 and 116. Each of the first and second pins extend into first frame plate 54 as well.

Vane 100 includes a wiper arm 118 having a generally cylindrical first end 120 and an elongated, substantially rectangular, second end 122. An opposed pair of co-axially aligned trunions 124 outwardly protrude from wiper arm 118 along axis 40. Each of trunions 124 includes an outer face 126 having a keyway 128 and a pair of threaded apertures 130 formed therein. Wiper arm 118 includes a pair of grooves 132 continuously extending about the periphery of wiper arm 118. A pair of seals 134 are disposed within grooves 132. Each of seals 134 sealingly engage body 94, first cover plate 96, second cover plate 98 and vane 100 to prevent pressurized fluid from passing thereby.

Rotary bearings 102 are positioned within bearing apertures 136 extending through each of first and second cover plates 96 and 98, respectively. A pair of elastomeric o-rings 138 are positioned between an inner-race 140 of rotary bearings 102 and trunions 124 of vane 100. Each rotary bearing 102 is coupled to its respective cover plate by four fasteners 142. Body 94, first cover plate 96 and second c over plate 98 are interconnected by a plurality of threaded fasteners 144 and correspondingly internally threaded nuts 146.

Figure 6:
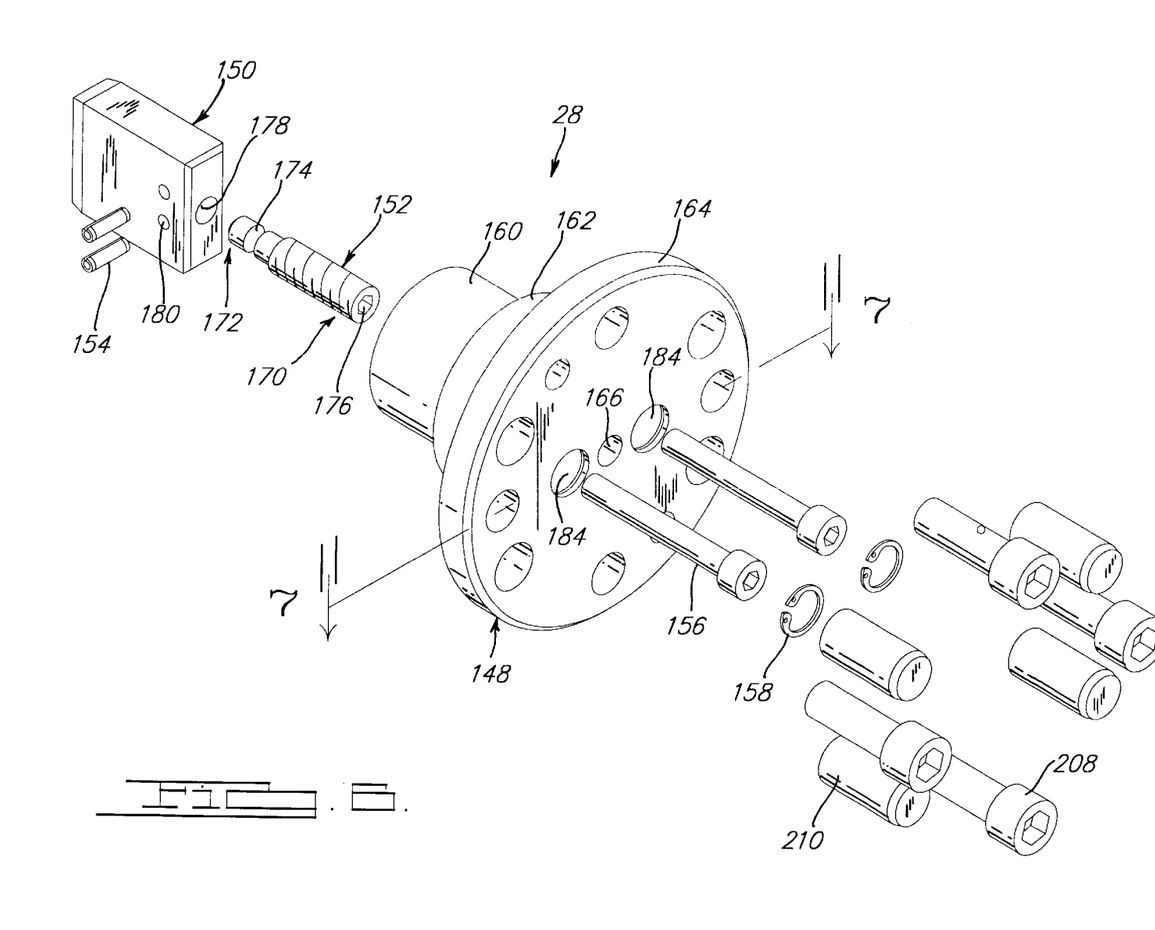
FIG. 6 is an exploded perspective view of a hub assembly of the powered pivot unit constructed in accordance with the teachings of the present invention.
Figure 7:
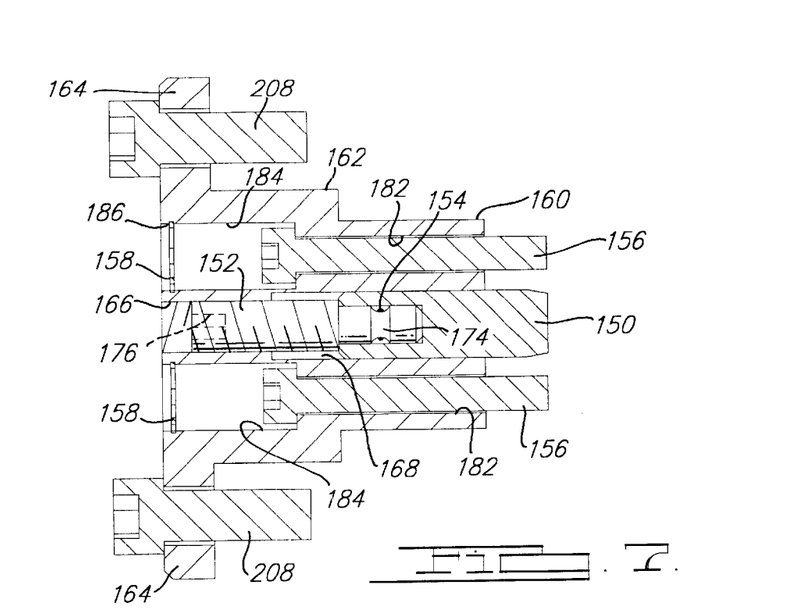
FIG. 7 is a cross-sectional side view, taken along line 7—7 shown in FIG. 6, of the hub assembly of the present invention.

Each of hub assemblies 28 are substantially identical to one another. Accordingly, only one hub assembly will be described. With reference to FIGS. 6 and 7, hub assembly 28 includes a hub 148, a key 150, a key retraction rod 152, roll pins 154, screws 156 and retaining rings 158.

Hub 148 includes an inner cylindrical journal 160, an adjacent, slightly larger, cylindrical journal 162 and a generally cylindrical flange 164. Hub 148 also includes a central internally threaded aperture 166 communicating with a substantially rectangular slot 168. As best shown in FIG. 7, rectangular slot 168 is sized to accept key 150 while aperture 166 is sized to threadingly engage the outer diameter of key retraction rod 152.

Key retraction rod 152 is a substantially cylindrically-shaped member having a first externally threaded end 170 and a stepped second end 172 having a reduced diameter. Second end 172 includes an annular groove 174. First end 170 includes a hexagonally-shaped receptacle 176. To construct hub assembly 28, second end 172 of key retraction rod 152 is inserted within a blind aperture 178 of key 150. Roll pins 154 are transversely inserted through apertures 180 to axially retain key retraction rod 152. It should be appreciated that roll pins 154 are positioned to allow key retraction rod 152 to rotate within blind aperture 178. The external thread of key retraction rod 152 is engaged with internally threaded aperture 1.66. Key retraction rod 152 in combination with key 150 effectively defines a jack screw wherein rotation of key retraction rod 152 axially displaces key 150 within slot 168.

Hub 148 also includes a pair of bores 182 having coaxial counter bores 184. Each of counter bores 184 include a ring groove for receipt of retaining rings 158. Counter bores 184 are of sufficient length to allow screws 156 to fully retract within bores 182 before contacting retaining rings 158. By using this manner of assembly, the sub-components of hub assembly 28 are captured within portions of 148 and will not be lost during service.

As shown in FIG. 2, arm assembly 24 includes a pair of rotator arms 186, a pair of tool mounting plates 188 and a pair of lock-out pin assemblies 190. Each of rotator arms 186 and tooling mounting plates 188 are substantially flat plates constructed from 6061-T651 Aluminum. Each rotator arm includes a first seat 192 and a second seat 194 having a plurality of threaded apertures 196 formed therein. Each tool mounting plate 188 includes slots (not shown) for receipt of first and second. seats 192 and 194, respectively. Once the seats are disposed within the slots, threaded fasteners 198 rigidly couple tool mounting plates 188 to rotator arms 186. Each rotator arm 186 includes an aperture to receive lock-out pin assembly 190. Lock-out pin assembly 190 includes a housing 200 and a lock-out pin 202. Lock-out pin 202 is selectively disposable within one of lock-out pin receptacles 62. Once lock-out pin 202 is disposed within one of the receptacles, arm assembly 24 is fixed relative to frame assembly 22 thereby allowing service to powered pivot unit 20 without reliance upon pressurized fluid within actuator assembly 26.

Figure 8:
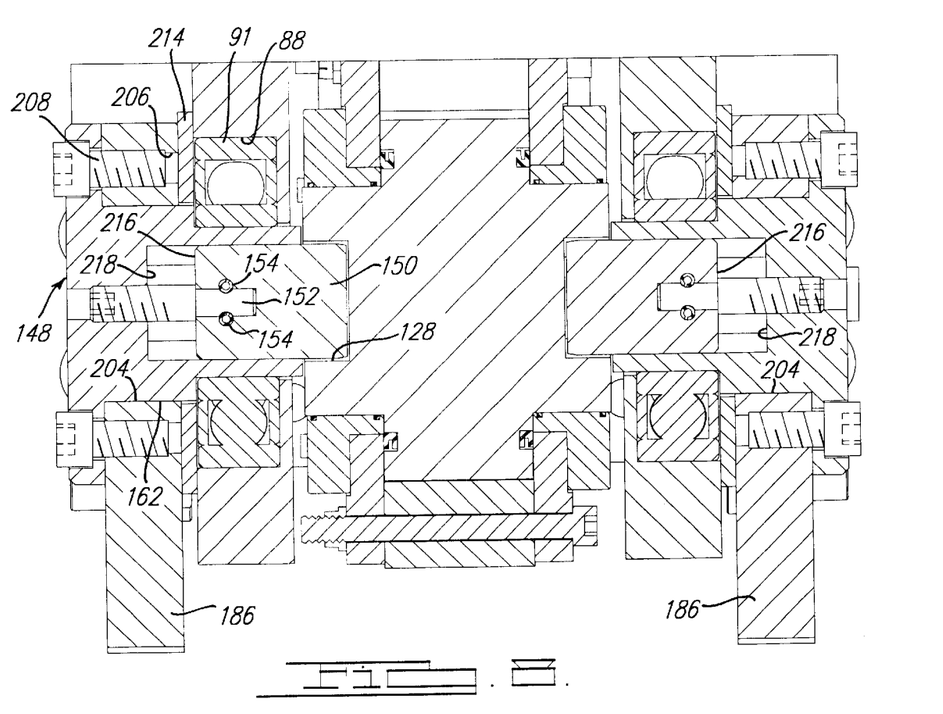
FIG. 8 is a cross-sectional top view, taken along line 8—8 shown in FIG. 2, of the powered pivot unit of the present invention.

Reference should now be made to FIGS. 2 and 8 wherein each rotator arm 186 includes an aperture 204 sized to cooperate with journal 162 of hub 148. Each rotator arm 186 also includes a plurality of threaded apertures 206 for receipt of fasteners 208. A plurality of pins 210 are slidingly disposed within apertures 212 to accurately align arm assembly 24 to hub assembly 28. Deep groove ball bearings 91 rotatably connect assembly 24 with frame assembly 22. Each ball bearing 91 is disposed within a counter bore 88. A washer 214 is positioned between each bearing 91 and rotator arm 186. FIG. 8 depicts key 150 in the engaged position disposed within keyway 128 of vane 100. As such, actuator 26 is drivingly coupled to positioning bracket 24. An additional driving interconnection exists between screws 156 and vane 100.

Actuator assembly 26 may also be drivingly disconnected from hub assembly 28. It should be appreciated that slot 168 is of sufficient depth to allow key 150 to be fully retracted within slot 168. A stop face 216 of key 150 contacts a bottom face 218 of slot 168 when key 150 is fully retracted. Therefore, key 150 is in a disengaged position clear of keyway 128 once stop face 216 engages bottom face 218. Screws 156 may be rotated out of threaded engagement with vane 100 to completely disengage actuator assembly 26 from positioning bracket 24.

Figure 9:
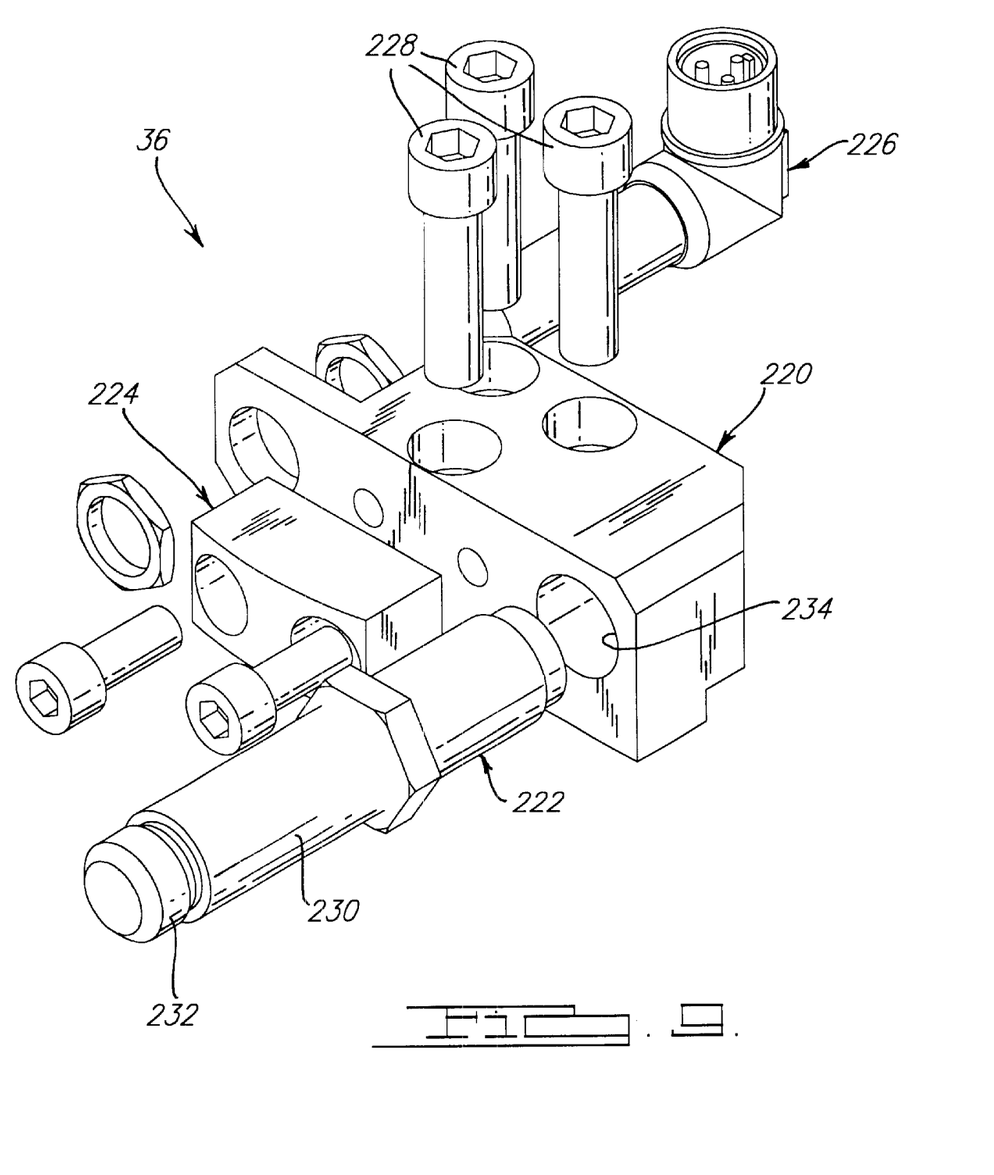
FIG. 9 is an exploded perspective view of an exemplary shock assembly of the powered pivot unit of the present invention.

With reference to FIG. 9, first shock assembly 36 will be described in detail. It should be appreciated that first shock assembly 36 is substantially identical to second shock assembly 38. Accordingly, only first shock assembly 36 will be described in detail. First shock assembly 36 includes a shock mount 220, a shock absorber 222, a crowned stop block 224, and a proximity switch 226. A set of three threaded fasteners 228 cooperate with shock mount 220 and threaded apertures 92 of second frame plate 56 to couple first shock assembly 36 to frame assembly 22. Shock absorber 222 includes a shock housing 230 having a piston 232 slidingly positioned therein. Shock housing 230 has a externally threaded portion engaged with an internally threaded aperture 234. Crowned stop block 224 is preferably constructed from a hardened ASC020 material. Both proximity switch 226 and crowned stop block 224 are coupled to shock mount 220 using standard fastening techniques.

Referring to FIG. 2, a pair of flat stop blocks 236 are shown coupled to an edge of rotator arm 186. Each of flat stop blocks 236 are positioned to engage crowned stop blocks 224 at the desired rotational stroke limit. One such stroke limit position is depicted in FIG. 1 where crowned stop block 224 of the first shock assembly 36 engages flat stop block 236 mounted at the upper end of rotator arm 186. A pair of contact bolts 238 are also mounted to the edge of rotator arm 186. Each of contact bolts 238 are positioned to engage piston 232 at a point in time before flat stop block 236 engages crowned stop block 224. Therefore, shock or impact type loading between the hardened stop blocks is avoided by assuring that shock absorber 222 dissipates most of the energy of rotation. A pair of sensor pins 240 are positioned adjacent flat stop block 236 and mounted to rotator arm 186. Sensor pins 240 are positioned to rotate within sensing proximity of proximity switch 226 once flat stop block 236 engages crowned stop block 224.

During operation, first shock assembly 36 may be positioned in any one of the four upper most keyways 42 to limit the rotation of arm assembly 24 in a clockwise direction. Similarly, second shock assembly 38 may be positioned in any one of the seven lower keyway positions to limit the rotation of arm assembly 24 in a counter-clockwise direction. No additional effort is required to separately relocate proximity switches or shock absorbers when an angular rotation change is desired. It should also be appreciated that first frame plate 54 also includes a plurality of like keyways (not shown) to assist the user in the manufacturing environment by allowing the stops and proximity switches to be mounted on the opposite side of frame assembly 22. In similar fashion, flat stop block 236, contact bolt 238 and sensor pin 240 may be mounted to either or both rotator arms 186.

Powered pivot unit assembly and actuator assembly removal will now be described. Frame assembly 22 and arm assembly 24 may be separately constructed. Specifically, first frame plate 54 and second frame plate 56 are coupled to first mounting plate 58 and second mounting plate 60 to form frame assembly 22. Similarly, two rotator arms 186 are coupled to two tool mounting plates 188 to form arm assembly or positioning bracket 24.

To continue in modular unit assembly fashion, actuator assembly 26 may be separately constructed by placing vane 100 within body 94 and coupling the first and second cover plates 96 and 98, respectively to body 94. Rotary bearings 102 are positioned over trunions 124 and coupled to the respective cover plate. At this time, either actuator assembly 26 or arm assembly 24 may be coupled to frame assembly 22. For example, to interconnect actuator assembly 26 to frame assembly 22, actuator assembly 26 is positioned between first frame plate 54 and second frame plate 56 to align first pin aperture 114 With first pin aperture 72. Second pin aperture 116 of actuator assembly 26 is aligned with second pin aperture 74 of the first and second frame plates.

First pin 30 and second pin 32 are disposed within the respective pin apertures to couple actuator assembly 26 to frame assembly 22. Keeper 78 is coupled to second mounting plate 60 to maintain the correct axial position of first pin 30. Similarly, keeper 84 is coupled to second frame plate 56 to maintain the axial position of second pin. 32. Ball bearings 91 are disposed within counter bores 88. Arm assembly 24 is placed into position to align aperture 204 along axis of rotation 40. Washer 214 is positioned between each of rotator arms 186 and their respective frame plate while hub assemblies 28 are axially inserted along axis 40. Inner cylindrical journal 160 engages an inner race 242 of bearing 91 as journal 162 engages aperture 204 of rotator arm 186.

It should be appreciated that if key 150 is in the extended position as shown in the figures, hub assembly 28 must be rotated until key 150 aligns with and engages keyway 128 of vane 100 before hub assembly 128 may be fully seated. Hub assembly 28 is fully seated when flange 164 abuts rotator arm 186. Screws 156 axially retain hub assembly 28 to vane 100. Pins 210 and threaded fasteners 208 couple hub assembly 28 to arm assembly 24. The peripheral hardware such as first shock assembly 36, second shock assembly 38, lock-out pin assemblies 190, flat stop block 236, contact bolt 238 and sensor pins 240 may be assembled at their respective locations at any time. It is noteworthy that once hub assembly 28 interconnects the aforementioned components, pressurized fluid entering inlet port 108 or outlet port 110 will cause arm assembly 24 to rotate about axis 40.

One powered pivot unit 20 has been assembled and placed into use, actuator assembly 26 may be replaced by following the procedural steps described hereinafter. Exemplary tool 53 need not be removed from arm assembly 24. Additionally, frame assembly 22 need not be disconnected from exemplary bench 48. To temporarily fix arm assembly 24 to frame assembly 22, lock-out pin 202 is engaged within the nearest receptacle 62. An external tool such as an allen wrench (not shown) is disposed within threaded aperture 166 to engage receptacle 176 of key retraction rod 152. Counter-clockwise rotation of key retraction rod 152 causes key 152 to axially move toward flange 164. Preferably, key retraction rod 152 is rotated until stop face 216 of key 150 abuts bottom face 218 of slot 168. This procedure is to be repeated for both hub assemblies 28. Screws 156 are rotated to threadingly disengage them from vane 100. Keepers 78 and 84 are next disconnected from second frame plate 56. Finally, first and second pins 30 and 32 are removed from their apertures. Actuator assembly 26 may now be removed. The aforementioned procedural steps may be performed in reverse order when installing a repaired or replacement actuator assembly.

Figure 10:
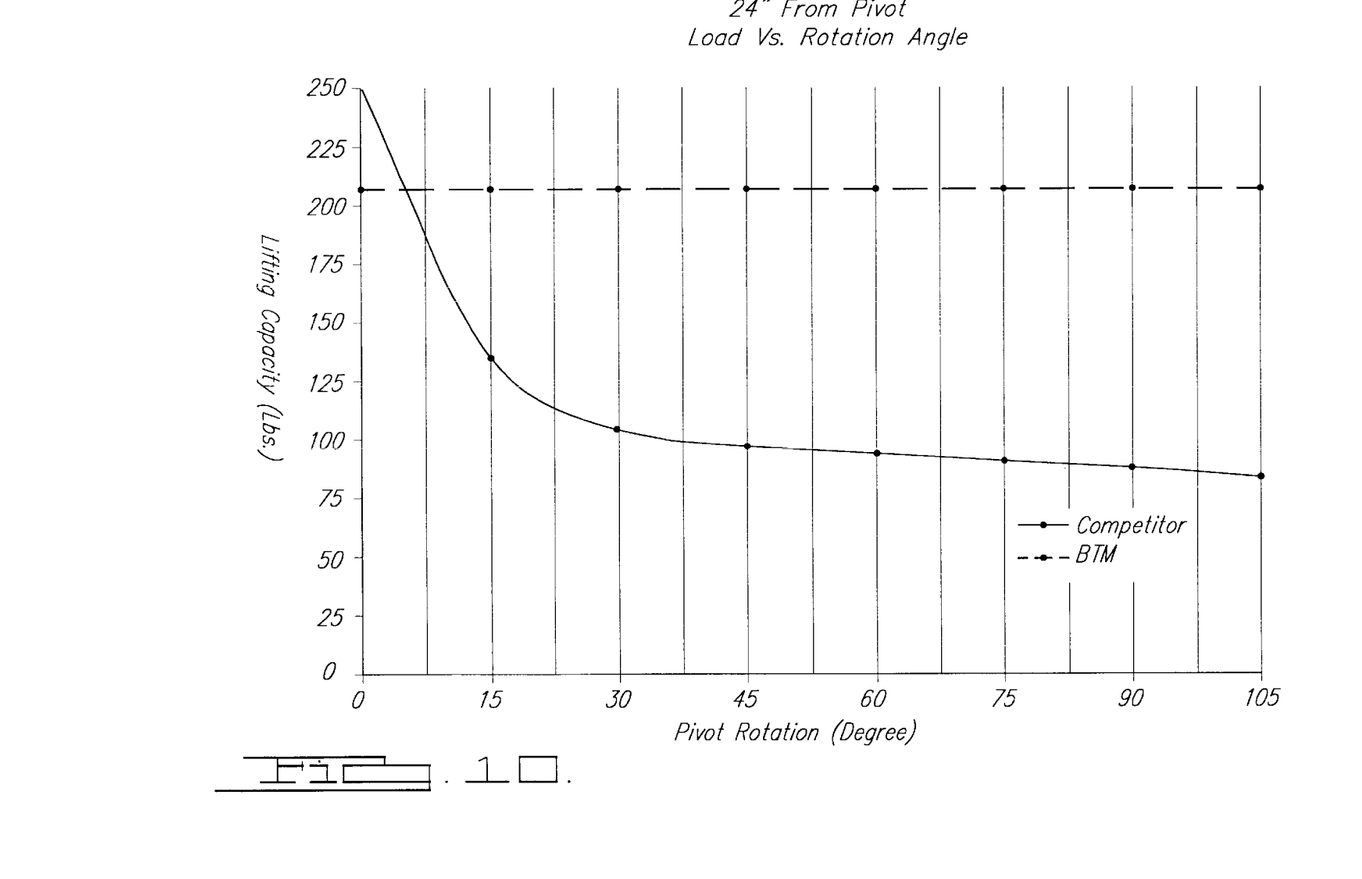
FIG. 10 is a graph depicting lifting capacity per pivot rotation.
Figure 11:
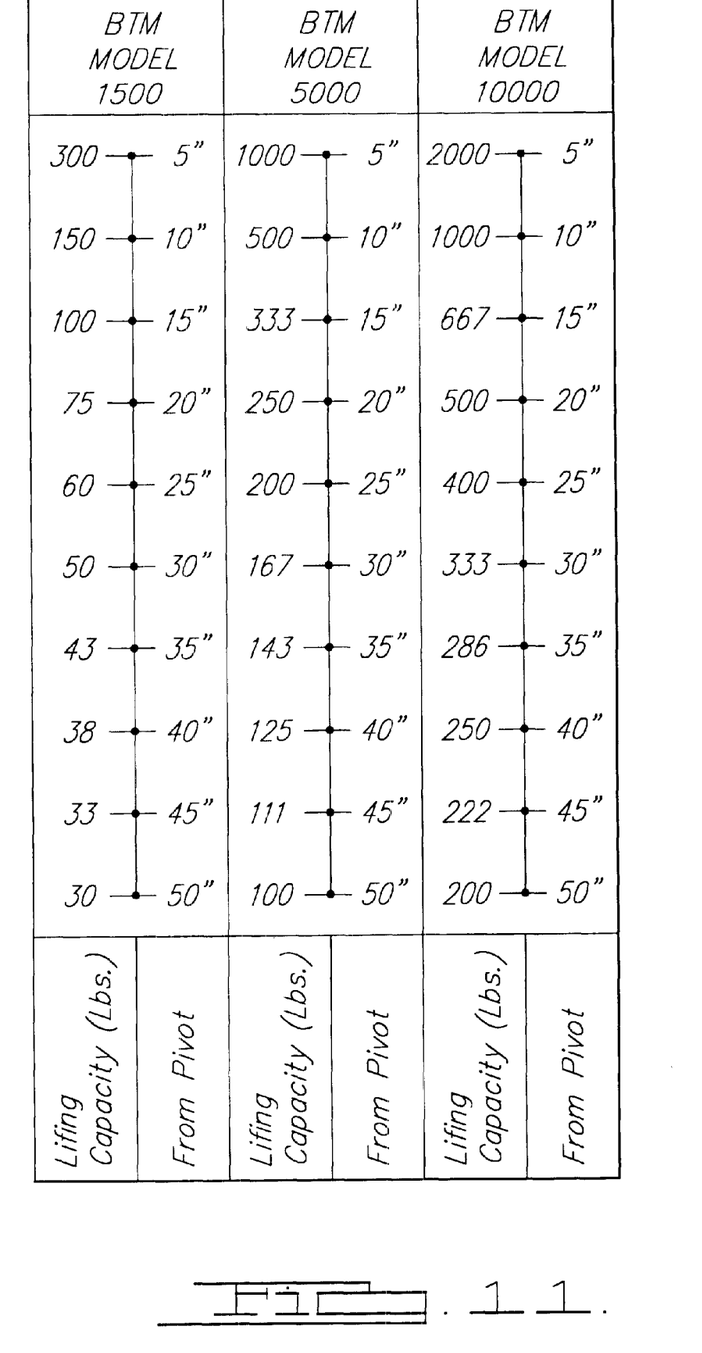
FIG. 11 is a graph depicting lifting capacity per distance from the axis of rotation of the present invention.

In operation, powered pivot unit 20 accepts a pressurized fluid, preferably air, at both inlet port 108 and outlet port 110. A pressure differential is generated by a suitable power source such as an air compressor (not shown) across inlet port 108 and outlet port 110. Accordingly, vane 100 responds by rotating toward the low pressure port. It is anticipated that a generally flat, constant torque output (negating the effect of inertial and gravitational forces) will be generated by the powered pivot unit of the present invention. With reference to FIG. 10, the force generated at a given distance from axis of rotation 40 will be substantially constant for each rotational position of vane 100. As such, the lifting capacity will be linearly related to the distance from axis 40 as depicted in FIG. 11. Vane 100 will continue to rotate until arm assembly 24 contacts the first shock assembly or the second shock assembly depending on the direction of rotation. The rotational direction of vane 100 may be reversed by simply pressurizing the opposite port.

While a preferred embodiment of the present invention has been disclosed herein, other aspects fall within the scope of the present invention. For example, other actuator to positioning bracket coupling mechanisms may be employed which use additional links or fasteners to drivingly interconnect the vane to the positioning bracket. Moreover, the removable actuator features may apply to clamps, grippers and part locators. The external disengagement tool may alternately be a screwdriver and may even be attached to the powered pivot unit. Other switch positioning angles and the total rotational angular range may be varied. While various materials have been disclosed, other materials may be employed.

The foregoing discussion discloses and describes merely exemplary embodiments of the present invention. One skilled in the art will readily recognize from such discussion, and from the accompanying drawings a n d claims, that various changes, modifications and variations may be made therein without department from the spirit and scope of the invention as defined in the following claims.

What is claimed is:

1. A powered positioning unit comprising:
   an arm;
   a housing having a chamber;
   a vane rotatably movable within said chamber; and
   an engaging member slidingly coupled to said arm, said engaging member being operably positionable in an engaged and a disengaged position with said vane, wherein said arm rotates in response to rotation of said vane when said engaging member is in said engaged position.

2. The powered positioning unit of claim 1 further including a hub assembly having a fastener rotatably coupled to said engaging member, wherein rotation of said fastener selectively moves said engaging member from said engaged position to said disengaged position.

3. The powered positioning unit of claim 1 further including a frame, wherein said frame includes a pair of substantially parallel offset plates positioned on either side of said housing.

4. The powered positioning unit of claim 1 wherein said arm is positioned substantially diametrically opposite said vane.

5. The powered positioning unit of claim 3 further including a second arm and a tool mounting plate, said tool mounting plate interconnecting said arm and said second arm, wherein said arm and said second arm are positioned substantially parallel to each other in an offset relationship.

6. The powered positioning unit claim 5 wherein said arm and said second arm are positioned substantially parallel to said offset frame plates.

7. The powered positioning unit claim 1 further comprising a second arm and a shock assembly, wherein rotation of said arm and said second arm is limited by said shock assembly.

8. The powered positioning unit of claim 7 wherein said shock assembly includes a shock absorber, a stop block and a proximity switch.

9. The powered positioning unit of claim 1 further including a frame, wherein said housing is detachable from said frame without removal of said arm from said frame.

10. The powered positioning unit of claim 1 further comprising at least one fluid port in communication with said chamber, said port operably allowing entry of fluid into said chamber to rotate said vane relative to said chamber.

11. The powered positioning unit of claim 10 wherein said fluid is air.

12. A positioning apparatus comprising:
a frame;
a rotary actuator coupled to said frame wherein said rotary actuator includes a driven member operably communicating with a pressurized fluid; and
a positioning bracket rotatably coupled to said frame and drivingly coupled to said rotary actuator, and wherein said positioning bracket at least partially surrounds said rotary actuator, wherein said positioning bracket and said actuator are drivingly coupled with a key being operably positioned in an engaged and a disengaged position, wherein said actuator and said positioning bracket are not drivingly coupled when said key is in said disengaged position.

13. The powered positioning unit of claim 12 wherein said positioning bracket is a generally "U" shaped member having substantially parallel arm portions interconnected by a tool mounting portion, wherein at least a portion of said actuator is positioned between said parallel arm portions.

14. The powered positioning unit of claim 13 wherein said frame is a generally "U" shaped member having substantially parallel leg portions interconnected by a mounting portion, wherein at least a portion of said actuator is positioned between said leg portions.

15. The powered positioning unit of claim 14 wherein said leg portions and said arm portions are substantially parallel to each other.

16. The powered positioning unit of claim 12 further comprising an industrial work piece interfacing said tool mounting portion of said positioning bracket.

17. A powered unit for moving or positioning industrial tooling comprising:
a frame;
a rotary actuator coupled to said frame; and
a positioning bracket having a mounting portion, said positioning bracket rotatably coupled to said frame and selectively coupled and decoupled to said rotary actuator, and wherein said positioning bracket at least partially surrounds said rotary actuator, wherein said rotary actuator includes
a vane and a chamber, said vane rotatably positioned within said chamber wherein said positioning apparatus further comprises at least one fluid port in communication with said chamber, said port operably allowing entry of fluid into said chamber to rotate said vane relative to said chamber.

18. A positioning apparatus comprising:
a frame;
a fluid powered actuator having a housing and a first member, said actuator being coupled to said frame, said first member being rotatably moveable by fluid pressure within said housing, said first member including an aperture;
a positioning bracket;
an industrial tool coupled to said positioning bracket;
a hub including a first journal, a second journal and a flange, wherein said first journal is rotatably coupled to said frame about an axis, wherein said second journal aligns said positioning bracket along said axis, and wherein said flange is coupled to said positioning bracket; and
a second member slidingly coupled to said hub, said second member being operable positionable in an engaged position within said aperture and a disengaged position outside of said aperture.

19. The powered positioning unit of claim 18 further including a retraction screw threadingly engaged with said hub, said retraction screw rotatably coupled to said second member such that rotation of said retraction screw axially displaces said second member.

20. The powered positioning unit of claim 19 wherein said retraction screw includes an annular groove and wherein said positioning apparatus further includes a roll pin coupled to said second member and wherein at least a portion of said roll pin is positioned within said annular groove thereby allowing rotation but resisting axial translation of said retraction screw relative to said second member.

21. The powered positioning unit of claim 20 wherein said actuator includes an inlet port and an outlet port for receipt of pressurized fluid, wherein said first member rotates toward the port having the least fluid pressure therein.

22. The powered positioning unit of claim 21 wherein said positioning bracket rotates in response to rotation of said first member when said second member is in said engaged position.

23. The powered positioning unit of claim 18 wherein said actuator is removable from said positioning apparatus without disconnecting said hub from said positioning bracket.

24. The powered positioning unit of claim 23 further including adjustably positioned stops mounted to said frame, said stops limiting a total range of articulation of said positioning bracket.

25. A powered positioning unit comprising:
a frame;
an arm having a mounting portion, said arm pivotably coupled to said frame;
a rotary actuator coupled to said frame, said rotary actuator being operable to rotate said arm relative to said frame, wherein said rotary actuator is removable from said positioning apparatus without disassembling said arm from said frame.

26. The powered positioning unit of claim 25 wherein said arm includes a tool mounting portion and wherein said positioning apparatus further includes an industrial tool coupled to said tool mounting portion.

27. The powered positioning unit of claim 25 wherein said arm rotates about a pivot axis and wherein said pivot axis extends through a portion of said actuator.

28. A method of operating a powered positioning unit having an actuator, at least one arm, an industrial tool mounting surface, and a frame, the method comprising:
(a) drivingly interconnecting the arm and the actuator with an operably engageable key;
(b) supplying fluid to the actuator;
(c) rotating a portion of the actuator about an axis extending through the actuator, by direct contact with the fluid;
(d) rotating the arm relative to the frame in response to movement of the portion of the actuator; and
(e) moving the tool mounting surface in response to movement of the arm.

* * * * *